M. FROEHLICH.
TRACTION WHEEL.
APPLICATION FILED JAN. 12, 1910.

1,002,665.

Patented Sept. 5, 1911.

Witnesses
W. N. Woodson
Juana M. Fallin

Inventor
M. Froehlich

By
R. H. A. N. Lacey, Attorneys

UNITED STATES PATENT OFFICE.

MAX FROEHLICH, OF RASATATT, GERMANY, ASSIGNOR, BY DIRECT AND MESNE ASSIGNMENTS, OF ONE-HALF TO RUDOLF H. FROEHLICH AND ONE-SIXTH TO ROBERT B. GREGG, BOTH OF STUTTGART, ARKANSAS, AND ONE-THIRD TO EDWARD C. POST, OF ANN ARBOR, MICHIGAN.

TRACTION-WHEEL.

1,002,665.  Specification of Letters Patent.  Patented Sept. 5, 1911.

Application filed January 12, 1910. Serial No. 537,666.

*To all whom it may concern:*

Be it known that I, MAX FROEHLICH, subject of the Emperor of Germany, residing at Rasatatt, Germany, have invented certain new and useful Improvements in Traction-Wheels, of which the following is a specification.

This invention relates to vehicle wheels and more particularly to a wheel especially designed for use on traction engines, trucks, agricultural machinery and the like.

The object of the invention is to provide a vehicle wheel having a plurality of traction shoes pivotally mounted on the rim thereof and adapted to bite into the ground and prevent slipping when pulling heavy loads.

A further object is to provide a traction device including a rim having means for attachment to the felly of a wheel and provided with spaced peripheral sockets for the reception of the pivoted traction shoes, means being provided for preventing accidental lateral displacement of said traction shoes.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
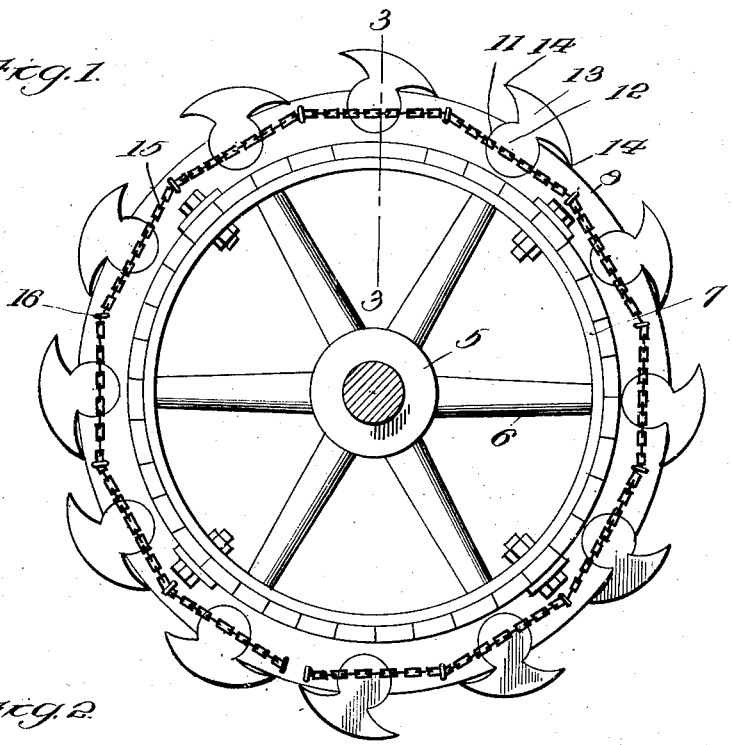
Figure 2:
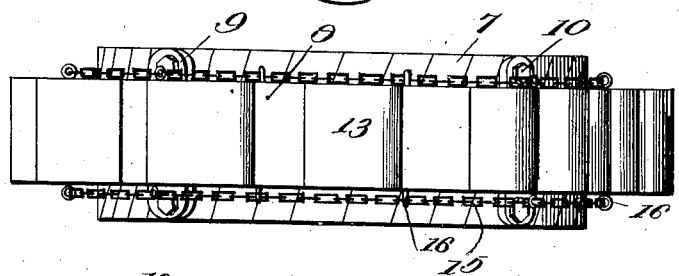
Figure 3:
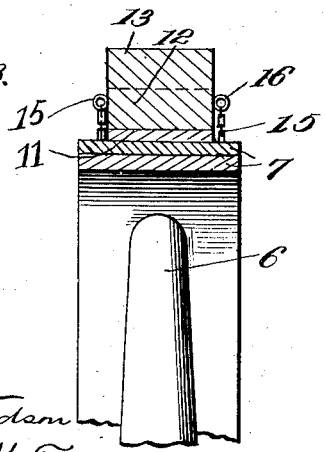
Figure 4:
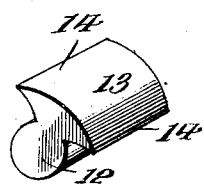

For a full understanding of the invention and the merits thereof and also to acquire a knowledge of the details of construction and the means for effecting the result, reference is to be had to the following description and accompanying drawings, in which:

Figure 1 is a side elevation of a wheel provided with a traction device constructed in accordance with my invention; Fig. 2 is a top plan view of the same; Fig. 3 is a transverse sectional view taken on the line 3—3 of Fig. 1; Fig. 4 is a detail perspective view of one of the traction shoes detached.

Corresponding and like parts are referred to in the following description and indicated in all the views of the drawings by the same reference characters.

The traction device forming the subject matter of the present invention may be attached to any type of vehicle wheel and by way of illustration is shown in connection with the wheel of a traction engine in which 5 designates the hub, 6 the spokes, and 7 the felly.

The device comprises a rim 8 having attaching lugs 9 extending laterally on opposite sides thereof for engagement with the felly 7, said rim being secured in position on the felly, by bolts or similar fastening devices 10.

Formed in the periphery of the rim 8 are a plurality of sets of segmental sockets 11 in which are pivotally mounted for tilting movement suitable traction shoes 12. The traction shoes 12 each comprise a substantially cylindrical body portion arranged to fit within one of the sockets 11 and a flared head 13, the exposed surface of which is curved or rounded to produce terminal spurs 14 adapted to bite into the ground and prevent slipping of the wheel when pulling heavy loads.

As a means for preventing accidental lateral displacement of the traction shoes, suitable securing elements 15 are provided, being preferably in the form of chains and retained in position on the opposite sides of the rim 8 by passing said chains through guiding members or staples 16 secured to the opposite faces of the rim 8, as best shown in Fig. 1 of the drawings.

It will here be noted that the chains extend transversely across the sockets 11 and in the path of the shoes 12, said chains serving to prevent the shoes from being forced laterally through the sockets, while at the same time permitting a slight lateral movement of the shoes with relation to the periphery of the rim. If desired however, suitable clamping bands or rings may be secured to the rim 8 for preventing accidental displacement of the shoes in lieu of the flexible securing elements or chains 15. Thus it will be seen that when the wheel is rotated in the direction of the arrow indicated in Fig. 1 of the drawings, the spurs 14 of the traction shoes will successively bite into the ground and increase the traction surface of the wheel. It will also be noted that the shoes are pivotally mounted for tilting movement so that the spurs 14 thereof will successively engage the ground regardless of the direction of travel of the wheel.

It is preferred to make the rim 8 slightly narrower than the felly of the wheel in order to permit the attachment of the lugs 9, but if desired, the rims 8 may be made the same width as the felly and said rim retained in position on the felly by having the attaching lugs 9 embrace the adjacent edges of said felly, without departing from the spirit of the invention.

Having thus described the invention, what is claimed as new is:

1. A tire having peripheral sockets formed therein, traction shoes pivotally mounted within the sockets and each provided with a convex face projecting beyond the periphery of said tire and defining oppositely disposed spurs, and means fastened to the opposite sides of the tire and extending transversely across the sockets for preventing lateral movement of the traction shoes.

2. A tire having spaced peripheral sockets, traction shoes pivotally mounted for tilting movement within said sockets, and securing devices fastened to the opposite sides of the tire and extending transversely across the sockets at said shoes.

3. A tire having spaced peripheral sockets, traction shoes pivotally mounted for tilting movement within the sockets and each provided with oppositely disposed spurs, and securing elements carried by and independent of the tire and extending transversely across the sockets at said shoes.

4. A tire having laterally extending lugs for attachment to a wheel and provided with spaced peripheral sockets of segmental cross sectional formation, correspondingly shaped traction shoes pivotally mounted for tilting movement within the sockets and each provided with a convex face and oppositely disposed spurs, and securing devices independent of and fastened to the opposite faces of the tire and extending transversely across the sockets and said shoes.

5. A tire having means for attachment to a wheel and provided with spaced peripheral sockets, traction shoes pivotally mounted for tilting movement within said sockets and each provided with a convex face projecting beyond the periphery of said tire, guiding members secured to the opposite faces of the tire, and flexible securing elements threaded through said guiding members and extending transversely across the opposite ends of the traction shoes and said sockets.

In testimony whereof I affix my signature in presence of two witnesses.

MAX FROEHLICH. [L. S.]

Witnesses:
ERNEST L. IVES,
W. M. SCHMIDT.